UNITED STATES PATENT OFFICE.

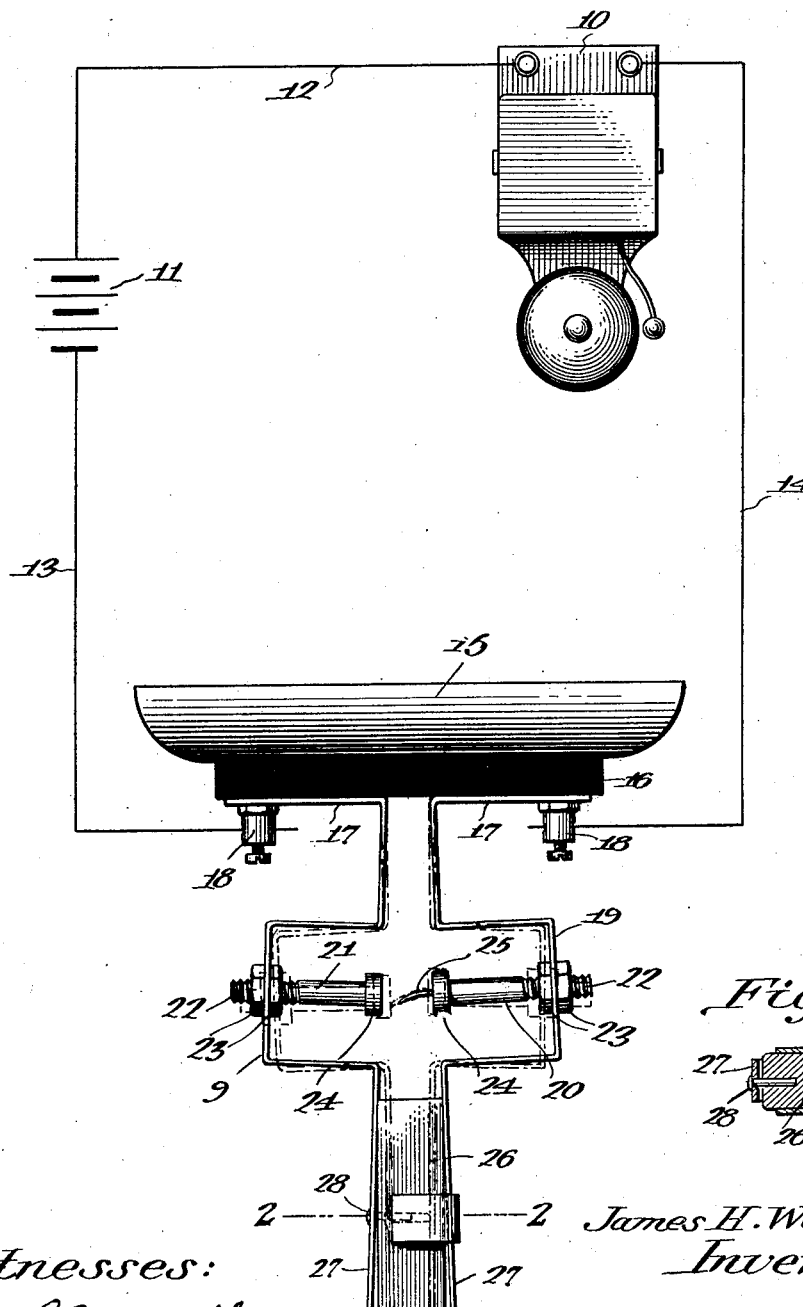

JAMES HENRY WALSH, OF SOUTH FRAMINGHAM, MASSACHUSETTS.

FIRE-ALARM.

1,068,469.  Specification of Letters Patent.  Patented July 29, 1913.

Application filed June 4, 1912. Serial No. 701,558.

*To all whom it may concern:*

Be it known that I, JAMES H. WALSH, citizen of the United States, residing at South Framingham, in the county of Middlesex and State of Massachusetts, have invented certain new and useful Improvements in Fire-Alarms, of which the following is a specification, reference being had therein to the accompanying drawing.

This invention relates to automatic fire alarms in which there is provided an electric circuit closer, the poles of which are normally held in spaced relation by a block which will melt readily under heat, so that if the room in which the circuit closer is placed gets on fire, the block will melt thus permitting the poles of the circuit closer to come in contact and thus ring a signal placed at a desired point.

Another object of the invention is to so construct the poles of the circuit closer so that even if the poles become corroded by rust or by any other cause, the circuit would be formed.

This invention is illustrated in the accompanying drawings, wherein:—

Figure 1 is a view showing the circuit closer in its normal position, the dotted lines indicating the position of the poles after the spacing block has been melted. Fig. 2 is a section along the line 2—2 in Fig. 1.

Referring to the accompanying drawings, it will be seen that this invention comprises an electric bell 10 which forms the signal, a battery 11 which is connected with the bell by means of the wire 12 and the circuit closer which is connected with the battery 11 by the wire 13 and with the bell 10 by means of the wire 14. This circuit closer comprises the base board 15 upon which there is mounted the insulating block 16.

Two resilient arms extend from the insulating plate 16 and each comprises the inner end portion 17 which is secured to the insulating block by means of the clamp 18 with which the ends of the wires 13 and 14 are connected, so that when the poles which are carried by the resilient arms are brought together, the circuit may be formed.

Each of the arms is bent intermediate its length to form the extension 19 with which the poles 20 and 21 are connected. The poles are provided with threaded ends 22 which pass through openings formed in the extension 19, and clamping nuts 23 are screwed upon the threaded ends of the poles so that after the poles have been adjusted to the desired points, the nuts 23 may be tightened, thus holding the poles in the adjusted position. Each of the poles has its inner end provided with an enlarged head 24, and a needle 25 extends from the head of the pole 20 and is adapted to come in contact with the head of the pole 21 so that the circuit will be formed. It should be noted that this needle 25 is shaped so that if the head of the pole 20 becomes corroded by rust or by any other cause, the needle will cut through the rust and thus form the circuit.

A block 26, which is preferably formed of wax or any other soft material which will melt at a low point of heat, is placed between the outer end portions 27 of the resilient arms and is held in place by the pin 28 carried by one of the arms and extending into the block, so that longitudinal movement of the block between the arms is prevented, and by the clamp 29 which is carried by the opposite arm and extends along the upper and lower faces of the blocks, so that transverse movement of the block between the arms is prevented. It will thus be seen that any danger of the block working loose and accidentally dropping out from between the arms and thus permitting the poles to come in contact to ring the bell, is prevented.

When in use the circuit closer is mounted in a desired room, and the signal is placed in a desired room and connected with the circuit closer by means of the wires 12, 13, and 14, the battery 11 being interposed between the wires 12 and 13. The block 26 normally holds the resilient arms in the position shown in Fig. 1, so that the poles 20 and 21 will be held out of contact. But if a fire breaks out in a room where the circuit closer is, the block 26 will melt thus permitting the arms to move to the position indicated by the dotted lines, and permit the needle 25 to come in contact with the head 24 of the pole 21. The needle cuts through any rust or any other foreign matter which may have collected upon the head of the pole 21, and forms a circuit so that a signal will be rung thus indicating that there is a fire in the room where the circuit closer is placed.

Having thus described my invention, what I claim is:—

In a device of the character described, a base plate, resilient arms extending from said base plate, contact members carried by said arms, a block of fusible material positioned between the outer end portions of said arms and normally holding said contact members in spaced relation, a pin carried by one of said arms and extending into said block to hold said block against longitudinal movement between the end portions of said arms, and a clamp carried by the other of said arms and engaging the opposite faces of said block to prevent transverse movement of said block between said arms.

In testimony whereof I hereunto affix my signature in presence of two witnesses.

JAMES HENRY WALSH.

Witnesses:
GEO. E. SULLIVAN,
CHAS. W. SHAW.

Copies of this patent may be obtained for five cents each, by addressing the "Commissioner of Patents, Washington, D. C."